(12) United States Patent
Miller

(10) Patent No.: US 9,497,610 B2
(45) Date of Patent: Nov. 15, 2016

(54) SYSTEM AND METHOD FOR ACCOUNTABILITY BY INTERLINKING ELECTRONIC IDENTITIES FOR ACCESS CONTROL AND TRACKING OF PERSONNEL DURING AN INCIDENT OR AT AN EMERGENCY SCENE

(71) Applicant: Salamander Technologies, Traverse City, MI (US)

(72) Inventor: Russell L. Miller, Traverse City, MI (US)

(73) Assignee: Salamander Technologies, LLC, Traverse City, MI (US)

(*) Notice: Subject to any disclaimer, the term of this patent is extended or adjusted under 35 U.S.C. 154(b) by 0 days.

(21) Appl. No.: 14/674,441

(22) Filed: Mar. 31, 2015

(65) Prior Publication Data

US 2015/0208223 A1    Jul. 23, 2015

Related U.S. Application Data

(63) Continuation of application No. 13/256,378, filed as application No. PCT/US2011/030488 on Mar. 30, 2011, now Pat. No. 8,995,946.

(60) Provisional application No. 61/318,983, filed on Mar. 30, 2010.

(51) Int. Cl.
| | |
|---|---|
| H04W 4/22 | (2009.01) |
| G06Q 10/06 | (2012.01) |
| G06Q 50/26 | (2012.01) |
| G08B 27/00 | (2006.01) |
| H04B 5/00 | (2006.01) |

(52) U.S. Cl.
CPC .............. *H04W 4/22* (2013.01); *G06Q 10/06* (2013.01); *G06Q 10/063112* (2013.01); *G06Q 50/26* (2013.01); *G08B 27/001* (2013.01); *H04B 5/0025* (2013.01)

(58) Field of Classification Search
CPC .. H04W 4/22; H04W 76/007; G08B 27/001; G08B 25/0164; H04M 11/04; H04M 2242/04
USPC ...................... 455/404.1, 404.2, 456.1, 456.6
See application file for complete search history.

(56) References Cited

U.S. PATENT DOCUMENTS

| | | |
|---|---|---|
| 8,009,810 B2 | 8/2011 | Seidberg et al. |
| 8,280,341 B2 | 10/2012 | Edelmann et al. |
| 2004/0174269 A1 | 9/2004 | Miller et al. |
| 2005/0017070 A1 | 1/2005 | Miller et al. |
| 2007/0185739 A1 | 8/2007 | Ober et al. |
| 2007/0194099 A1 | 8/2007 | Miller et al. |
| 2007/0223658 A1 | 9/2007 | Moore |
| 2008/0175356 A1* | 7/2008 | Seidberg ................ G08B 25/08 379/45 |
| 2008/0243545 A1 | 10/2008 | D'Ambrosia et al. |

(Continued)

*Primary Examiner* — Cong Tran
(74) *Attorney, Agent, or Firm* — Fredrickson & Byron, P.A.

(57) ABSTRACT

An incident management system includes some form of portable machine-readable data and a collector unit and optionally a manager unit for receiving the machine-readable data where one or all of the portable machine-readable data, the collector unit or the manager unit is provided in the form of a cell-enabled device. The portable machine-readable data may include identification information of a person or a resource/asset. By providing the portable machine-readable data in the form of cell-enabled devices each having a GPS unit, the location of the responders to the incident may be tracked in real time.

21 Claims, 3 Drawing Sheets

(56) References Cited

U.S. PATENT DOCUMENTS

| | | | |
|---|---|---|---|
| 2008/0320571 A1* | 12/2008 | Connell, II | G06Q 10/063112 726/6 |
| 2009/0002145 A1 | 1/2009 | Berry et al. | |
| 2009/0045942 A1* | 2/2009 | Schurter | G08B 27/001 340/539.11 |
| 2009/0099874 A1 | 4/2009 | Moncrease | |
| 2009/0136006 A1 | 5/2009 | Milton et al. | |
| 2009/0228352 A1 | 9/2009 | Waxman et al. | |
| 2009/0284348 A1* | 11/2009 | Pfeffer | G08B 25/006 340/7.3 |
| 2009/0319180 A1* | 12/2009 | Robinson | G06Q 10/10 701/532 |
| 2010/0115609 A1 | 5/2010 | Spence | |
| 2010/0298683 A1* | 11/2010 | Cabrera | A61B 5/0002 600/364 |
| 2011/0053560 A1 | 3/2011 | Jain et al. | |
| 2011/0111726 A1 | 5/2011 | Kholaif et al. | |

\* cited by examiner

SYSTEM AND METHOD FOR ACCOUNTABILITY BY INTERLINKING ELECTRONIC IDENTITIES FOR ACCESS CONTROL AND TRACKING OF PERSONNEL DURING AN INCIDENT OR AT AN EMERGENCY SCENE

CROSS-REFERENCE TO RELATED APPLICATION

This application is a continuation of U.S. patent application Ser. No. 13/256,378, entitled "SYSTEM AND METHOD FOR ACCOUNTABILITY BY INTERLINKING ELECTRONIC IDENTITIES FOR ACCESS CONTROL AND TRACKING OF PERSONNEL DURING AN INCIDENT OR AT AN EMERGENCY SCENE," by Russell L. Miller, which is a national stage application under 35 U.S.C. §371 of PCT Application No. PCT/US2011/030488, filed on Mar. 30, 2011, which claims the benefit under 35 U.S.C. §119(e) of U.S. Provisional Patent Application Ser. No. 61/318,983, entitled "SYSTEM AND METHOD FOR ACCOUNTABILITY BY INTERLINKING ELECTRONIC IDENTITIES FOR ACCESS CONTROL AND TRACKING OF PERSONNEL AT AN INCIDENT OR EMERGENCY SCENE," filed Mar. 30, 2010, the entire disclosures of which are hereby incorporated herein by reference.

BACKGROUND OF THE INVENTION

The present invention is generally directed to an incident management system and method for allowing one or more incident managers to account for resources, emergency responders, volunteers, victims, and evacuees at the scene of an incident.

Incidents may arise from a natural disaster (i.e., tornado, earthquake, flood, etc.), emergency situations (i.e., hazardous material spills, fires, traffic accidents, plane crashes, etc.), or from terrorist activity. Nearly every fire department or other emergency responder department faces the problems of accounting for its personnel and resources at the scene of such incidents as well as knowing the status and location of personnel and resources not currently at the scene.

Previously, to account for its personnel at a scene of an emergency, a fire department might require firefighters reporting to a scene to report to an incident commander who would assign the firefighter to a particular sector or subsector of the emergency site. Ideally, the incident commander will decide which sector of the scene to assign the firefighter based upon the firefighter's training and experience. However, when dealing with a number of volunteer firefighters or firefighters from other districts or departments, the incident commander may not know the level of training and experience of the reporting firefighter. As a result, firefighters may inadvertently be placed at risk of serious injury. The incident commander may expose himself or herself and the fire department to a liability suit should a firefighter be injured after being assigned to a sector having a particular type of fire that the firefighter is not qualified to fight.

Additionally, an incident commander would ideally know which firefighters are assigned to each sector or subsector of the emergency site and would also know when and how long the firefighters have been located in their assigned sectors. By knowing which firefighters are assigned to which sectors, the incident commander can more effectively assign and reassign firefighters to the various sectors. Further, by knowing when and how long a firefighter has been within a particular sector, the incident commander can determine whether a particular firefighter has been in the particular sector for too long and whether the firefighter should be reassigned for temporary rehabilitation (rehab). Additionally, the fire department or medical personnel may determine how long a particular firefighter was exposed to toxic fumes in order to determine the best course of treatment for the firefighter. Unfortunately, the only way for the fire department to keep such records was to manually maintain a notebook including this information. Such notebooks are impractical to maintain at the scene of an emergency where there may be excessive smoke and water that could damage the notebook. Furthermore, not only does making the necessary entries into the notebook take a substantial amount of time, but the time required to subsequently look up the desired information makes the use of notebooks even more impractical.

The problems relating to firefighter accountability and record-keeping on the scene have been magnified greatly in the recent past due to regulations put on fire departments by state and federal occupational safety and health administrations (OSHA). When assigning firefighters to various sectors and subsectors, an incident commander would certainly benefit by having more information regarding what potential dangers may be present in each sector and subsector in order to ensure that the firefighters assigned to the sectors and subsectors are qualified to deal with these potential dangers. For example, if an incident commander knew that a particular subsector of a building contained certain hazardous materials, the incident commander could assign firefighters to this subsector who are qualified to deal with those hazardous materials.

In view of the inherent danger in fighting fires or otherwise responding to other incidents, the odds that a firefighter shall require medical attention are higher than usual. Therefore, it would be desirable to maintain the medical history of each firefighter at the site. However, maintaining and transporting documentation having this information presents additional burdens upon the fire department. This problem is amplified when numerous volunteers and firefighters from other districts are called to the scene of an emergency.

The assignee of this application has addressed the above problems using computerized accountability systems. Such systems are disclosed in commonly-assigned U.S. Pat. Nos. 5,596,652 and 5,793,882. In these systems, the responders report to the scene with a portable machine-readable ID that not only identifies the responder but also includes the responder's qualification information. This information is read and stored in a computer by the incident command and is used to assign the responder to a task or sector based upon the responder's qualifications. The responder's time in a particular sector may then be monitored and recorded.

Incidents may constitute mass casualty incidents, which represent a major logistical challenge for emergency response personnel who must locate, triage, treat, stage, transport, and deliver numerous victims to medical facilities or a morgue. To address these challenges, the assignee of this application developed a system for tracking victims of a mass casualty incident. An example of such a system is disclosed in commonly assigned U.S. Pat. No. 6,761,312.

The Sep. 11, 2001, terrorist attacks highlighted various deficiencies in how emergency or civilian responders to, or victims of, a large-scale incident are tracked at the scene of an incident. In general, such tracking has been required for both logistics and site security. The current state-of-the-art had been to login personnel or victims at one or more staging points. At login, a record of the person had been created either using pencil and paper or a computerized log. A temporary ID had then been issued or a designator (e.g., color sticker, grease pen markings) applied to a pre-existing ID to indicate the status of a person (e.g., approved to be on-site, triage status, etc.). That method was time-consuming, non-standardized and prone to human error. To address these issues, the assignee of the present invention developed a new system that reads the responder's identification and qualification information and then generates an incident-specific credential that is subsequently read by portable data terminals dispersed at various locations at the large-scale incident. An example of that system is disclosed in commonly-assigned U.S. Pat. No. 7,191,934.

SUMMARY

According to one embodiment, an incident management system includes at least one cell-enabled device each comprising memory having stored therein identification information that identifies a person associated with that cell-enabled device, and an identification collector unit for collecting identification information from the at least one cell-enabled device and for communicating verification information to the at least one cell-enabled device to verify receipt of the identification information.

According to another embodiment, an incident management system includes: at least one portable machine-readable data including machine-readable identification information that identifies a person associated with that portable machine-readable data; and an identification collector unit for collecting identification information from the at least one portable machine-readable data, wherein the identification collector unit is a cell phone.

According to another embodiment, an incident management system includes: at least one portable machine-readable data including machine-readable identification information that identifies a person associated with that portable machine-readable data; at least one identification collector unit for collecting identification information from the at least one portable machine-readable data; and a manager unit for communicating with the at least one collector unit, wherein the manager unit is a cell phone.

According to another embodiment, an incident management system includes: a plurality of cell-enabled devices each comprising memory having stored therein identification information that identifies a resource associated with that cell-enabled device, and a GPS unit for determining a location of that cell-enabled device; and an identification collector unit for collecting identification information from the cell-enabled devices and for receiving location information from the cell-enabled devices so as to track the locations of the resources associated with the cell-enabled devices.

According to another embodiment, a machine-readable medium is provided that is encoded with a data structure for use on at least one of: a cell-enabled device and a smart ID card associated with a person responding to an incident. The data structure comprises a plurality of linked data components associated with the responding person. The data components comprises: a fixed data component including at least one of: name, date of birth, unique ID number, gender, photo, fingerprint, and issuing agency; a variable data component including at least one of: rank, qualifications, certifications, authorization codes, and expiration; and an incident-specific data component including personal information related to a specific incident, emergency, or event that the person is responding to, or involved in.

According to another embodiment, a method of managing resources responding to an incident where a plurality of resources may respond to the incident from a plurality of interlinked communities, the method comprising: providing a plurality of cell-enabled devices each having a GPS unit for determining a location of the cell-enabled device; providing identification information on a cell-enabled device associated with each of the resources; collecting the identification information and location information from the cell-enabled devices of the resources associated with a first one of the plurality of interlinked communities; collecting the identification information and location information from the cell-enabled devices of the resources associated with a second one of the plurality of interlinked communities; and providing a first manager unit for the first one of the plurality of interlinked communities, where the first manager unit receives the identification information and location information from the cell-enabled devices of the resources associated with the first one of the plurality of interlinked communities and further receives the identification information and location information from the cell-enabled devices of the resources associated with the second one of the plurality of interlinked communities.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
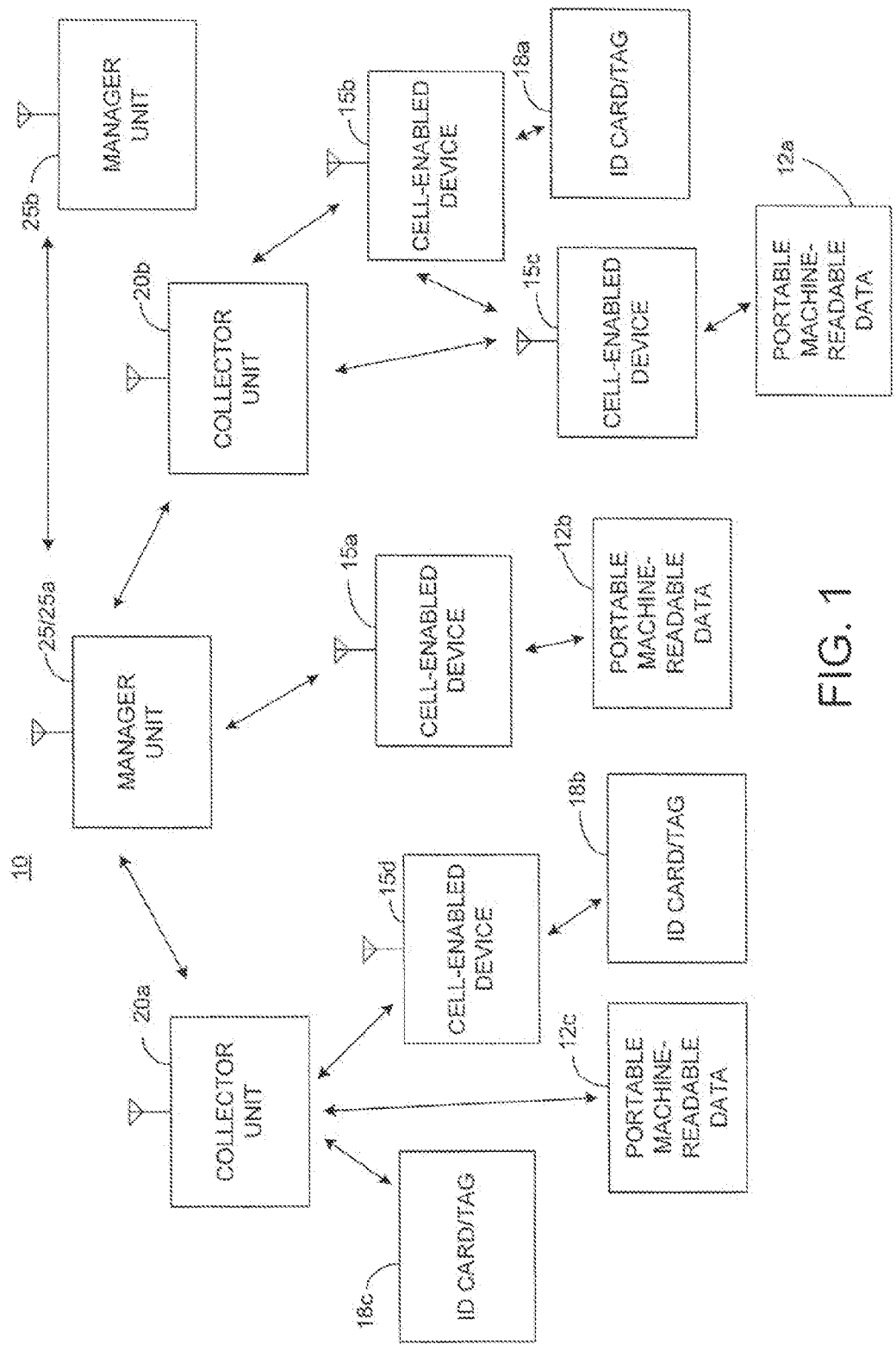
FIG. 1 is a block diagram illustrating an embodiment of an incident management system.

The incident management system 10 described below and shown in FIG. 1 includes many different optional features that may be implemented separately or in various combinations to form many different embodiments. In a broadest sense, the incident management system includes some form of portable machine-readable data 12a-12c and a collector unit 20 for receiving the machine-readable data where one or both of the portable machine-readable data or the collector unit is provided in the form of a cell-enabled device 15a-15d. The portable machine-readable data may include identification information of a person or a resource/asset.

A new generation of cell phones and other cell-enabled devices promises to revolutionize how people and communities are identified and tracked. Besides offering wide area voice and data communications, cell phones are now being equipped with local area communication capabilities including Wi-Fi as well as close proximity communications such as BLUETOOTH™ and Near Field Communication (NFC). Cell phones can contain basic identity information on the user including a unique identifier (UID) as well as corresponding name, emergency contacts, etc. Cell phones already have a mobile subscriber identity (15 digit IMSI number) which, along with GPS applications, allows them to function as locator devices within a cellular network enabling members of a community to identify and locate other members of that community in real time. Cell phones can act as data collectors to capture the identities of other members of a community by "bumping" or reading their cell phone in some fashion. Cell phones can act as mass notification devices where a central authority sends out a mass notification alert.

Applications that capitalize in new cell phone technologies are first appearing in the mass, commercial market where easily downloaded "apps" can return high ROIs. Adoption in public safety markets has challenges for several reasons including the lack of an integrated, secure system for tracking personnel that meets the three basic requirements for effective resource management under the U.S. National Incident Management System (NIMS):

1. Personnel Identity Verification (PIV): The ability to validate a person's identity and that their status and privileges are still current. PIV is typically used for access control to an incident or event and extends the commercial concept of "community" into a secure, identity verification process that is administered by a controlling authority or jurisdiction that vets a member's identity, maintains their current status (i.e. valid or revoked), and provides various form factors to authenticate a person in the field.
2. Personnel Accountability: The ability to track a person—responder, volunteer, or civilian victim—as a resource/victim in an incident command system structure. This requires capturing basic identification information on the person as well as qualifications or certifications on what task or role that person is capable of performing.
3. Personal Locator: The ability to provide real-time, or near real-time, geographical location of a person that is remote to, in transit to, or part of an incident or event.

As used herein "an incident management system" is a system that allows one or more incident managers to account for resources, emergency responders, volunteers, victims, and evacuees both at the scene of an incident and coming to or leaving the scene. Such incidents may include fires, disaster scenes from hurricanes, earthquakes, tsunamis, tornados, floods and other natural disasters, mass casualty events, terrorist activities, hazardous material spills, traffic accidents, and plane crashes.

As also used herein "a cell-enabled device" comprises a cell phone and any other devices that are capable of communicating over a cellular communication network, including, but not limited to, laptop computers, netbooks, iPads, and tablets.

As shown in FIG. 1, an incident management system 10 may include one or more collector units 20a and 20b (referenced collectively as 20) and at least one portable machine-readable data 12a-12c (referenced collectively as 12) having stored therein machine-readable identification information that identifies a person associated with that portable machine-readable data 12. Collector unit 20 collects identification information from the at least one portable machine-readable data 12. The at least one portable machine-readable data 12 may take various forms including ID cards/tags 18a-18c (referenced collectively as 18) and/or cell-enabled devices 15a-15d (referenced commonly as 15). By functioning with a wide variety of identification artifacts, the system is more flexible and allows integration with systems employed by other jurisdictions. Incident management system 10 may optionally include manager unit 25 as described further below.

According to a first embodiment, the incident management system 10 may include at least one cell-enabled device (preferably a plurality of cell-enabled devices) 15a-15d (referenced commonly as 15) each comprising memory (32, FIG. 2) having stored therein identification information that identifies a person associated with that cell-enabled device 15a-15d, and one or more identification collector units 20a and 20b (referenced collectively as 20) for collecting identification information from the at least one cell-enabled device 15 and for communicating verification information to the at least one cell-enabled device 15 to verify receipt of the identification information.

The persons associated with the cell-enabled devices 15 may include responders to an incident. The identification information may be received from the cell-enabled devices as the responders report for the incident. In addition to responders, victims or other civilians at the scene of the incident may also be associated with the cell-enabled devices 15. Further, resources/assets may also be associated with the cell-enabled devices 15. Note that although only four cell-enabled devices 15a-15d are shown in FIG. 1, there may be many more depending on the scale of the incident. Depending on with whom or what the cell-enabled device is associated, the memory of which may further include other information including qualification information, authenticity certificates, biometric data, physical location, etc.

According to a second embodiment, as also depicted in FIG. 1, an incident management system 10 comprises: at least one portable machine-readable data 12 including machine-readable identification information that identifies a person associated with that portable machine-readable data 12; and an identification collector unit 20 for collecting identification information from the at least one portable machine-readable data 12, wherein the identification collector unit 20 is a cell phone.

According to a third embodiment, as also depicted in FIG. 1, an incident management system 10 comprises: at least one portable machine-readable data 12 including machine-readable identification information that identifies a person associated with that portable machine-readable data 12; at least one identification collector unit 20 for collecting identification information from the at least one portable machine-readable data 12; and a manager unit 25 for communicating with the at least one collector unit, wherein the manager unit 25 is a cell phone.

As described further below and relative to all of the above embodiments, the identification information and any other information in the memory 32 of the cell-enabled device 15 may be received by collector unit 20 in several different ways. For example, this information may be transmitted wirelessly via cellular network (if collector unit 20 is a cell-enabled device), via a wireless local area network such as WiFi, via close proximity communications such as BLUETOOTH™ or Near Field Communication (NFC), or via infrared (IR). In addition, cell-enabled devices 15 may be configured to also display the information in the form of a bar code (possibly a two-dimensional PDF 417 bar code) on its display 34 that may be read by a scanner of collector unit 20.

Figure 2:
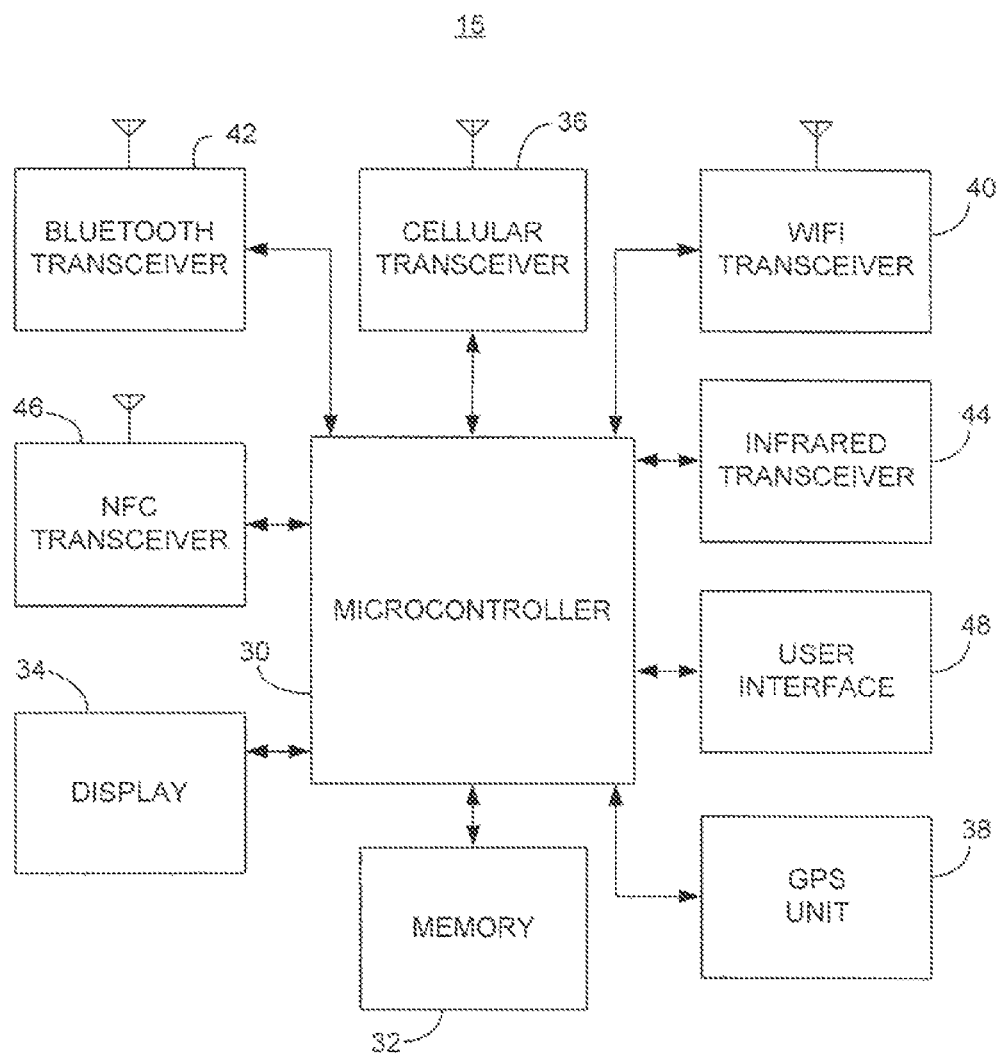
FIG. 2 is a block diagram illustrating an embodiment of a cell-enabled device useful in the incident management system shown in FIG. 1.

An example of a cell-enabled device 15 is shown in FIG. 2. Cell-enabled device 15 may include a controller 30, a memory 32, a display 34, a cellular transceiver 36, and a GPS unit 38. Cell-enabled device 15a may optionally include one or more of a WiFi transceiver 40, a BLUETOOTH™ transceiver 42, an IR transceiver 44, an NFC transceiver 46, and a user interface 48, which may be a keypad or may be integrated with display 34 as a touchsensitive display. If the cell-enabled devices 15a-15d are carried by persons at the scene of the incident, it may be preferable that the cell-enabled devices 15a-15d are provided in the form of a cell phone, more preferably a smart phone. Commercially available smart phones typically include the hardware described above. Moreover, the software for implementing the functions described herein may be downloaded to the phones as a downloadable app.

According to a fourth embodiment, as depicted in FIGS. 1 and 2, an incident management system 10 comprises: a plurality of cell-enabled devices 15 each comprising memory 32 having stored therein identification information that identifies a resource associated with that cell-enabled device 15, and a GPS unit 38 for determining a location of that cell-enabled device 15; and an identification collector unit 20 for collecting identification information from the cell-enabled devices 15 and for receiving location information from the cell-enabled devices 15 so as to track the locations of the resources associated with the cell-enabled devices 15.

There are three modules to the system: 1. Identity Management; 2. Incident Management; and 3. Reporting and Resource Management. Each of these three modules is discussed in order below. All of the three modules are related to the various embodiments outlined above.

1. Identity Management

Software is provided so that a controlling authority (e.g. agency, department, community, etc.) can gather data on individuals under their jurisdiction. This includes, but is not limited to:
  Name, rank, serial number, agency, qualifications, certifications, training levels
  Emergency contact and medical information
  Biometrics: digital image, fingerprint, etc.
  Effective/Expiration Date
  Role
  Other . . .

These data elements are the same elements one would normally incorporate into an ID card or credential per the systems disclosed in commonly-assigned U.S. Pat. Nos. 5,596,652, 5,793,882, and 7,191,934, the entire disclosures of which are incorporated herein by reference. However, in this case the cell-enabled device 15 is considered the identification artifact. However, this does not preclude using ID cards 18a-18c that could mirror or even be linked to the identity of the cell-enabled device 15 by means of contact, contactless or near field communications. This raises some high potential parent/child use cases where an ID card or tag 18a-18c may be a preferred form factor versus a cell-enabled device 15—for instance, if a responder wanted to leave an ID card or tag 18a-18c at a staging area or command post (a physical, visual artifact) versus relinquishing his/her cell-enabled device 15.

Figure 3:
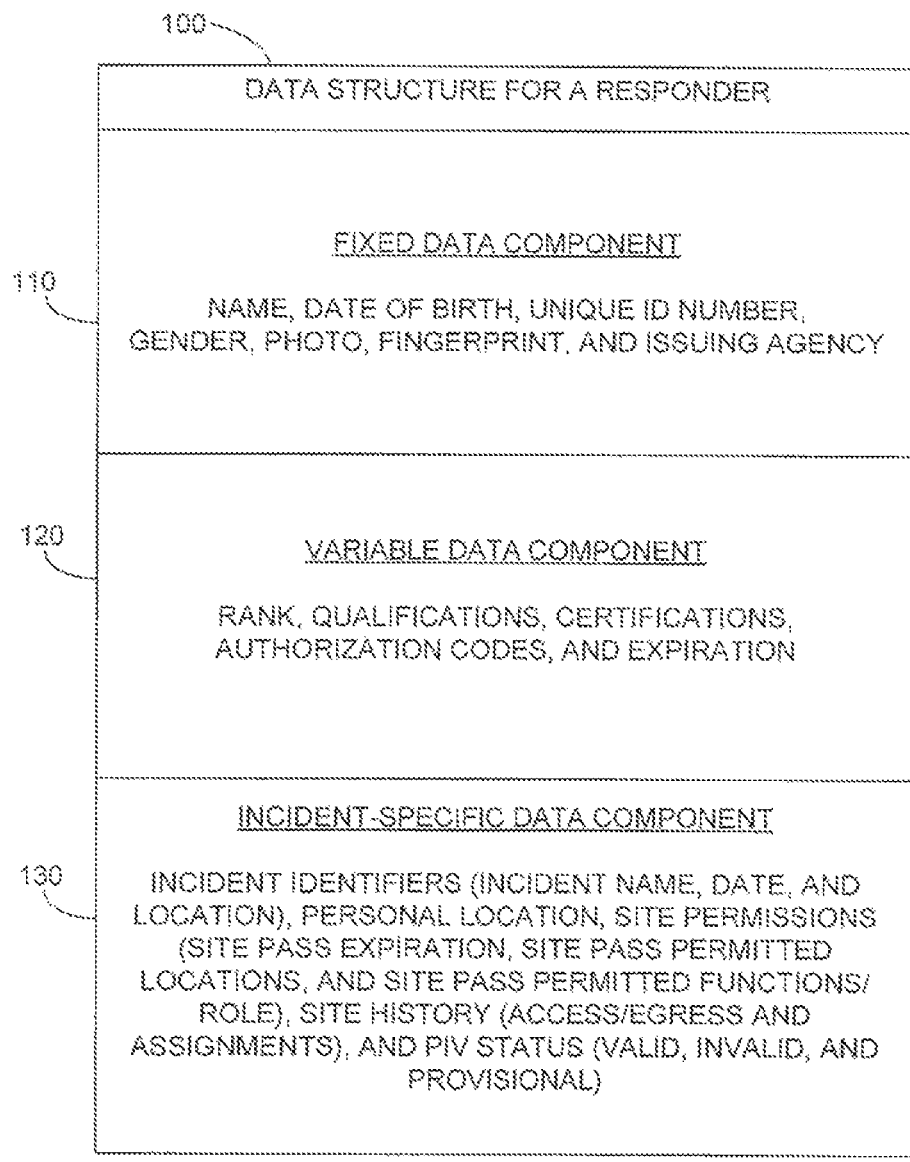
FIG. 3 is a block diagram showing a data structure that may be used in the incident management system shown in FIG. 1.

Data elements may be grouped into three logical data containers constituting three data components of a data structure 100 (FIG. 3) associated with the responder:
  Fixed Data Component 110: This data container is for personal information or attributes that are fixed in nature or do not change for the purpose of the ID card. This data can/should be "read only" in that it should not change over time and needs to be secure. Fixed data elements to be addressed may include: Name, Date of Birth, Unique ID Number, Gender, Photo, Fingerprint, Issuing Agency, etc.
  Variable Data Component 120: This data container is for personal information or attributes that are variable in nature and can/should be "read/write" in that they need to be updated as these attributes change. Variable data elements to be addressed may include: Rank, Qualifications, Certifications, Authorization Codes, Expiration, etc. An authorization code may be a secure certificate that indicates that the card is still valid as of the last update/synchronization with an identity management system or identity privilege list.
  Incident-Specific Data Component 130: This data container is for personal information or attributes related to the specific incident, emergency, or event that the person is responding to, or involved in. Incident specific data elements to be addressed may include: Incident Identifiers (e.g. incident name, date, location), Personal Location (e.g. GPS), Site Permissions (e.g. Site Pass Expiration, Site Pass Permitted Locations, Site Pass Permitted Functions/Role), PIV Status (valid, invalid, provisional), Site History (e.g. access/egress, assignments, etc). The incident-specific data container is "live" throughout the incident or event and provides a wealth of information for resource managers during and post-incident. This container can be downloaded (for archival or reporting purposes) and flushed upon closure of the incident.

Data elements would be encoded in the cell-enabled device of the various personnel. The primary role to be granted would be that of an individual resource. A person's data record would be entered in the memory 32 of the cell-enabled device 15 so that the cell-enabled device acts as a portable data file that is survivable even if cell networks are down. It should be noted that the data record could be encoded in the persistent memory of the cell-enabled device 15 or it could be encoded in a SDRAM card, a SIM card, or similar removable memory device. In this variant, a removable memory device could be used to personalize a "blank" cell phone or device if such cell-enabled device 15 were to be reused from event to event.

In the above context, a fifth embodiment is provided for a machine-readable medium encoded with a data structure for use on a cell-enabled device associated with a person responding to an incident, said data structure comprising a plurality of linked data components associated with the responding person, the data components comprising: a fixed data component including one or more of: name, date of birth, unique ID number, gender, photo, fingerprint, and issuing agency; a variable data component including one or more of: rank, qualifications, certifications, authorization codes, and expiration; and an incident-specific data component including personal information related to a specific incident, emergency, or event that the person is responding to, or involved in.

As used herein "machine-readable medium" is a computer-readable medium or may be another medium readable by a machine comprising a microprocessor that may not otherwise be considered a computer.

The cell-enabled device 15 would be able to transmit the data record in several fashions:
  By generating a wide area RF signal
  By generating an NFC or BLUETOOTH™ signal
  By having the cell-enabled devices 15 render a high capacity barcode on its display screen 34
  By generating an IR signal It should be noted that the later three methods highlight two novel aspects of this system and method for resource management:

A cell-enabled device 15 can communicate with an NFC signal or by rendering a barcode without having the cellular network up—that is, the communication is field survivable.

An NFC signal, IR signal or rendered barcode could only be "received" via an affirmative, close proximity action at a staging point or access control point—typically manned by an incident manager who can authenticate the transaction and provide a visual inspection of a cell-enabled device phone owner. This provides a key level of security.

In addition to the basic role of an individual resource, other roles can be provided to a person's cell-enabled device 15:

Unit Collector: This role allows the person to act as a group or team leader. His/her cell-enabled device 15 serves as collector unit 20 and would be capable of reading/scanning other people's cell-enabled devices to form a unit, group, or team—a fundamental tracking element within NIMS. This could be done by RF, NFC, or barcode scan. This new team record would be tracked as an entity unto itself, but that also has the underlying data records of the individuals within the team.

Unit Manager: This role allows the person to act as an incident manager tracking groups or teams. In this case, the unit manager's cell-enabled device 15 would serve as manager unit 25a and would read/scan the Unit Collectors' cell-enabled devices 20 to form a Task Force or track all units at scene.

This interlinking of identities using peer-to-peer communication is extremely powerful in an incident management context providing redundancy and survivability or information.

It should be noted that while the system being described may be a closed-loop system administered and secured by a controlling authority, the system can be opened-up or syndicated between other controlling authorities. For instance, two different county emergency management agencies could link their databases and records so that resources from the one county could be identified and tracked by the other county. Indeed, a preferred method would be to have the system syndicated between emergency management departments within a county, region or state so that the incident management system is interoperable for all responders.

Furthermore, there is nothing to preclude opening up the system to the public. That is, an app could be made available to the public so that their cell phones would have a standardized identity format (including emergency contact and medical info) so they could be tracked/identified during an emergency—for instance, as a patient or evacuee being tracked by emergency management agencies. Of course, this would have different security requirements and constraints versus fully vetted personnel who are under the jurisdiction of the controlling authority.

In summary, under the proposed system, a person's cell-enabled device 15 would become an identity artifact with the person's data record attached, which may include qualifications, biometrics, and a unique identifier mapped to the cell-enabled device's mobile subscriber identity and associated GPS applications. The cell-enabled devices 15 would be able to transmit (NFC) or render (barcode) that data record in the field. Some cell-enabled devices 15 could have special roles to capture individual data records and form teams, or capture team records to amalgamate and track teams. In this manner, all of the pieces are in place to address identity verification, personnel accountability, and personnel locating during an incident.

2. Incident Management

The current state of the art for automated resource management is to use high capacity ID cards or tags to perform identity verification functions and personnel accountability functions—typically at the scene on an incident (e.g. staging or access control point) as per U.S. Pat. Nos. 5,596,652, 5,793,882, and 7,191,934. The cards/tags can be visually inspected and scanned/read (using barcodes or smart-card/RFID) to capture important identity information, biometric information, qualifications, etc. Location is really not captured other than you can capture the location (via GPS) where the card was read/scanned/presented and/or assign a person to a location or sector in your incident management system—in either case, the person's location is typically not being tracked in real time as he/she moves around the incident scene or site. This is understandable in that a typical card/tag does not have the form factor or power required to provide active GPS transmissions.

In contrast, the cell-enabled device 15 as an identity artifact with wide area communications can extend the physical concept of an incident and provide real time location. So, for instance, during an incident, a mass notification can be sent out to personnel in the "community" to respond to the incident. Furthermore, members of the community can be located on a geographical map as "available" resources. In addition, responding resources can respond to the notification and thereby be tracked as "in transit." Upon reaching the scene, they can undergo a more traditional check-in by presenting their cell-enabled device to be read—either with a barcode rendered on their screen, or by emitting a signal (NFC) with the formatted identity information required. Basic identity information would be captured, including qualifications and certifications, so that the person can access the site, be assigned to an appropriate task or assignment, and be tracked throughout the incident. Also, if it is a high security event or incident, the cell-enabled device can be presented for identity verification purposes—that is, does the cell-enabled device have a legitimate, unrevoked certificate, does the holder of the cell-enabled device know the PIN number to access secure identity information encoded in the device, and finally, does the cell-enabled device holder have a biometric match with the biometrics stored in the cell-enabled device? As previously discussed, identify verification can be used to validate people under your jurisdiction as well as other jurisdictions if you allow them to be part of your community (i.e. link the identity management databases and identity privilege lists).

As previously mentioned, cell-enabled devices 15 can be given the role of a collector unit 20 whereby they read (NFC) or scan (rendered barcodes) other individual's cell-enabled devices to create a team. Of course, this team can be formed remotely from the incident (i.e. at the station or in-transit in the cab) and information can be transmitted from a remote location so that a team is "available," or "in transit," or "on-scene."

In many cases a cell-enabled device might not be an acceptable device for use in a hot zone or other hazmat scene. In these cases, the cell-enabled device can be used as a preexisting ID that is stripped of data to create an incident specific tag(s) that mirrors the identity of the cell-enabled device. These tags can contain machine-readable media (barcode, smart-card, RFID, etc.) that then become interlinked with the cell-enabled device's identity. This use case extends an application already disclosed in U.S. Pat. No.

7,191,934. However, instead of using a Driver's License or other preexisting ID card, a cell-enabled device is used as the preexisting ID artifact.

Conversely, an agency may want to use cell-enabled devices as the primary tracking artifact. They may actually have a pool stock of "blank" cell phones that can become personalized by having them link to a high capacity memory card such as a smart-card (read via NFC) or an SDRAM card (read by inserting) which contains the individual's identity information.

It should be noted that the use of a cell-enabled device as an identify artifact provides a new paradigm for layered security as follows:
  Low Security: Cell-enabled device is recognized on the network and its unique identifier is validated against an allow/deny list.
  Moderate Security: Cell-enabled device has been interrogated in near proximity (NFC or barcode read) which indicates an affirmative action by incident managers at a staging or access control point.
  High Security: Cell-enabled device and individual have been interrogated to provide an identity verification match (i.e. PIN and/or Biometric).

It should also be noted that cell-enabled devices can be used in a read/write fashion so that an incident log or history is created on the phone as it proceeds throughout an incident. An example of entries may include:
  Received notification from dispatch 07:00
  Assigned to team 07:15
  Assignment staging 07:20
  Identity verification 07:22
  Assignment logistics 08:00
  Medical check at rehab 08:15 (medical data accessed by ID#12345)
  Demobilized 09:00
  Etc.

In this manner, not only is the incident management system 10 tracking the individual, but the individual is also creating an incident log that can be used for various purposes including:
  a. Time and attendance
  b. Hazmat exposure
  c. Chain of custody
  d. Medical privacy This also provides survivability and redundancy of incident data if the incident management system goes down or is compromised in some fashion.

In summary, the system 10 uses the cell-enabled device 15 as the primary identification artifact for incident management. It contains data that is critical for personnel accountability (including qualifications and certifications) as well as identity verification (including biometrics) at the scene of an incident. The cell-enabled device 15 can communicate this data in the field in a coms-out environment. By having wide area communications and GPS 38, the cell-enabled device 15 can also extend the concept of an incident allowing incident managers to monitor resources of the defined community that are "available," "in-transit," or "on-scene." Besides having the role of an individual resource, a cell-enabled device 15 can act as a collector unit 20 or a manager unit 25 to manage standardized incident manage groupings. The use of cell-enabled devices 15 also provides graduated levels of security which correspond to remote detection, close-proximity detection (human monitored) and biometric authentication.

3. Reporting and Resource Management

The final module is a reporting module and extends into resource management functions.

As with traditional incident management systems, all incident activity can be captured and reported on on-scene using a command system and off-scene using web-based applications. In addition, individual cell-enabled devices 15 can have their incident logs stripped to supplement data captured by the command module and/or provide an archive of an individual's history for any given incident or event.

The unique aspect about integration cell phone technologies is the expansion resource management functions. That is, instead of just having a static list of resources (personnel, units, apparatus, etc.) that might be available during an incident, cell-enabled devices can provide a real-time status of the resource (i.e. "available," "in transit," "on-scene," etc.). These resources could be grouped by interlinked communities. So, for instance, during a major incident or emergency, an incident manager could initially monitor his/her community's resources and then expand the view to monitor the resources of adjacent communities or mutual aid.

In a preferred method, a virtual inventory can be provided where the incident manager sees the number and type of resources that are "available," "in-transit," and "on-scene." This would occur in real-time and would provide GPS coordinates. This view could be expanded to incorporate the resources of adjacent communities and mutual aid. This is an extremely powerful tool for resource management that takes advantage of cellular networks.

Accordingly, as depicted in FIGS. 1 and 2, a sixth embodiment provides a method of managing resources responding to an incident where a plurality of resources may respond to the incident from a plurality of interlinked communities. The method comprising: providing a plurality of cell-enabled devices 15 each having a GPS unit 38 for determining a location of the cell-enabled device 15; providing identification information on a cell-enabled device 15 associated with each of the resources; collecting the identification information and location information from the cell-enabled devices 15 of the resources associated with a first one of the plurality of interlinked communities; collecting the identification information and location information from the cell-enabled devices 15 of the resources associated with a second one of the plurality of interlinked communities; and providing a first manager unit 25a for the first one of the plurality of interlinked communities, where the first manager unit 25a receives the identification information and location information from the cell-enabled devices 15 of the resources associated with the first one of the plurality of interlinked communities and further receives the identification information and location information from the cell-enabled devices 15 of the resources associated with the second one of the plurality of interlinked communities. The second one of the interlinked communities may have a second manager unit 25b that communicates with the cell-enabled devices in its community and shares the information with the first manager unit 25a.

An implicit feature of the resource management system is automatic data capture of resources as they are staged, deployed, and demobilized in reference to an incident or event. All transactions are captured with time and date stamps. This information provides a basis for reimbursing agencies as they deploy resources. This information provides a history of an individual or team that can be linked to their personnel records. This information can be used to recreate an incident or event for the purposes of hot wash or, perhaps, litigation or claims.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A non-transitory machine-readable medium for use in an identification collector unit of an incident management system for managing emergency responders arriving at a scene of an incident, the identification collector unit including a processor and a communication interface under control of the processor, said machine-readable medium being encoded with instructions that, when executed by the processor, cause the processor to execute the steps comprising:
   controlling the communication interface to collect identification information from a plurality of cell-enabled devices as responders report to the scene of the incident;
   in response to receiving the identification information, accessing qualification information for each responder that identifies the qualifications of the responder associated therewith; and
   at least one of (a) determining if a reporting responder is allowed access to the incident scene and (b) assigning a task to the reporting responder, based upon their qualifications.

2. The machine-readable medium of claim 1, wherein the identification information comprises at least one of: name, date of birth, unique ID number, gender, photo, fingerprint, issuing agency, rank, qualifications, certifications, authorization codes, expiration, and personal information related to a specific incident, emergency, or event that the responder is responding to or involved in.

3. The machine-readable medium of claim 1, wherein the instructions further cause the processor to execute the step of building groups of linked identities from the received identification information in order to track groups of responders at the scene of the incident.

4. The machine-readable medium of claim 1, wherein the communication interface comprises a near field communication transceiver.

5. The machine-readable medium of claim 1, wherein the communication interface includes at least one cell-enabled device that communicates wirelessly through both cellular communication and at least one other wireless communication protocol used to communicate with the plurality of cell-enabled devices.

6. The machine-readable medium of claim 1, wherein the identification information includes biometric information that may be used to verify the identity of the responder associated with one of said cell-enabled devices.

7. The machine-readable medium of claim 1, wherein the identification information includes a unique identifier that can be compared against a database of valid/revoked IDs to verify that each of the cell-enabled devices is still valid/not revoked.

8. The machine-readable medium of claim 1, wherein the instructions further cause the processor to execute the step of receiving qualification information from the cell-enabled devices.

9. The machine-readable medium of claim 1, wherein the instructions further cause the processor to execute the step of generating the identification information stored in a memory of one of said cell-enabled devices after receiving initial identification information from at least one ID card/tag.

10. The machine-readable medium of claim 1, wherein the instructions further cause the processor to execute the step of generating identification information included in at least one ID card/tag that identifies a responder associated with that ID card/tag after receiving the identification information from a cell-enabled device also associated with the responder with which the at least one ID card/tag is associated.

11. A non-transitory machine-readable medium for use in an identification collector unit of an incident management system for managing emergency responders arriving at a scene of an incident, the identification collector unit being a cell-enabled device with a processor and a communication interface under control of the processor, said machine-readable medium being encoded with instructions that when executed by the processor, cause the processor to execute the steps comprising:
   controlling the communication interface to collect identification information from at least one portable machine-readable data associated with a responder as the responder reports to the scene of the incident;
   in response to receiving the identification information, accessing qualification information for each responder that identifies the qualifications of the responder associated therewith; and
   at least one of (a) determining if a reporting responder is allowed access to the incident scene and (b) assigning a task to the reporting responder, based upon their qualifications.

12. The machine-readable medium of claim 11, wherein said at least one portable machine-readable data is an ID card/tag having the identification information stored therein.

13. The machine-readable medium of claim 11, wherein said at least one portable machine-readable data is a cell-enabled device having the identification information stored therein.

14. The machine-readable medium of claim 11, wherein the instructions further cause the processor to execute the steps of collecting the identification information from a plurality of the portable machine-readable data and forming at least one group that links said plurality of the portable machine-readable data.

15. An incident management system for managing emergency responders to a scene of an incident comprising:
   at least one portable machine-readable data including machine-readable identification information that identifies a responder associated with that portable machine-readable data;
   at least one identification collector unit physically separate from the at least one portable machine-readable data for collecting identification information from said at least one portable machine-readable data as the responder reports to the scene of the incident; and
   a manager unit for communicating with said at least one collector unit, wherein said manager unit is a cell-enabled device.

16. The incident management system of claim 15, wherein said at least one portable machine-readable data is an ID card/tag having the identification information stored therein.

17. The incident management system of claim 15, wherein said at least one portable machine-readable data is a cell-enabled device having the identification information stored therein.

18. The incident management system of claim 15, wherein said at least one portable machine-readable data presents a bar code representing the identification information to said cell-enabled identification collector unit, and wherein said cell-enabled identification collector unit reads the bar code to receive the identification information.

19. The incident management system of claim 15, wherein said at least one portable machine-readable data includes a plurality of portable machine-readable data that comprises at least one ID card/tag having the identification information stored therein and at least one cell-enabled device having the identification information stored therein.

20. The incident management system of claim 15, wherein said at least one collector unit is a cell-enabled device.

21. The incident management system of claim 15, wherein said at least one collector unit collects the identification information from a plurality of said portable machine-readable data and forms at least one group that links said plurality of said portable machine-readable data.

* * * * *